United States Patent [19]
College

[11] Patent Number: 5,769,940
[45] Date of Patent: Jun. 23, 1998

[54] PROCESS FOR PRODUCING CEMENT AND ELEMENTAL SULFUR FROM A FLUE GAS DESULFURIZATION WASTE PRODUCT

[75] Inventor: John W. College, Pittsburgh, Pa.

[73] Assignee: Dravo Lime Company, Pittsburgh, Pa.

[21] Appl. No.: 901,457

[22] Filed: Jul. 28, 1997

Related U.S. Application Data

[63] Continuation-in-part of Ser. No. 852,798, May 7, 1997.
[51] Int. Cl.$^6$ .............................. C04B 7/36; C04B 7/43; C01B 17/02
[52] U.S. Cl. ......................... 106/745; 106/752; 106/757; 106/761; 106/763; 106/765; 106/769; 423/541.1; 423/567.1; 423/569; 423/570
[58] Field of Search .................................. 106/745, 752, 106/757, 761, 763, 765, 769; 423/567.1, 569, 570, 541.1

[56] References Cited

U.S. PATENT DOCUMENTS

| | | | |
|---|---|---|---|
| 2,863,726 | 12/1958 | Kamlet ..................................... | 106/752 |
| 3,607,045 | 9/1971 | Wheelock et al. .................. | 423/541.1 |
| 3,717,489 | 2/1973 | Herzog et al. ........................... | 106/752 |
| 4,028,126 | 6/1977 | Mori et al. .............................. | 106/749 |
| 4,040,853 | 8/1977 | Binder et al. ........................... | 106/757 |
| 4,065,320 | 12/1977 | Heian et al. ............................ | 106/752 |
| 4,102,989 | 7/1978 | Wheelock ............................ | 423/541.1 |
| 4,120,645 | 10/1978 | Heian et al. ............................. | 106/752 |
| 4,432,954 | 2/1984 | Quante ..................................... | 106/752 |
| 4,487,784 | 12/1984 | Kuroda et al. ........................... | 106/752 |
| 4,662,945 | 5/1987 | Lawall .................................... | 106/752 |
| 5,512,097 | 4/1996 | Emmer .................................... | 106/745 |
| 5,626,667 | 5/1997 | Bohle ..................................... | 106/745 |

FOREIGN PATENT DOCUMENTS

| | | | |
|---|---|---|---|
| 2759249 | 7/1979 | Germany ................................ | 106/752 |
| 59-045948 | 3/1984 | Japan ..................................... | 106/745 |
| 1112180 | 5/1968 | United Kingdom ................... | 106/745 |

OTHER PUBLICATIONS

"Gypsum Finds New Role in Easing Sulfur Shortage", Process Flowsheet, Nov. 4, 1968/Chemical Engineering.
"Sulphuric Acid and Cement From By–Product Gypsum" CHEMICO Offer Process Developed by OKC Corp., Sulfur No. 79, Nov./Dec. 1968.
"Production of Sulphuric Acid or Sulphur From Calcium Sulphate" Dorr–Oliver's Investigations of Fluosolids Roaster System Applications, Sulphur No. 80, Jan./Feb. 1969.
"Sulphuric Acid and Cement From Phosphoric Acid by–product Phospho–Gypsum" Sulphur No. 74, Jan./Feb. 1968.
"The Manufacture of Cement and Sulphuric Acid From Calcium Sulphate", United Nations Industrial Development Organization Vienna, United Nations Publication, New York, 1971 (No Month).
"Reduction of Sulfur Dioxide by Syngas to Elemental Sulfur Over Iron–Based Mixed Oxide Supported Catalyst", Environmental Progress (vol. 16, No. 1), Spring 1997 (No Month).

*Primary Examiner*—Anthony Green
*Attorney, Agent, or Firm*—Armstrong, Westerman, Hattori, McLeland & Naughton

[57] ABSTRACT

Cement and elemental sulfur are produced by forming a moist mixture of a flue gas desulfurization process waste product containing 80–95 percent by weight calcium sulfate hemihydrate and 5–20 percent by weight calcium sulfate hemihydrate, aluminum, iron, silica and carbon, agglomerating the moist mixture while drying the same to form a feedstock, and calcining the dry agglomerated feedstock in a rotary kiln. Sulfur dioxide produced during the calcination is cooled and contacted with hydrogen and carbon monoxide to reduce the same to elemental sulfur.

11 Claims, 1 Drawing Sheet

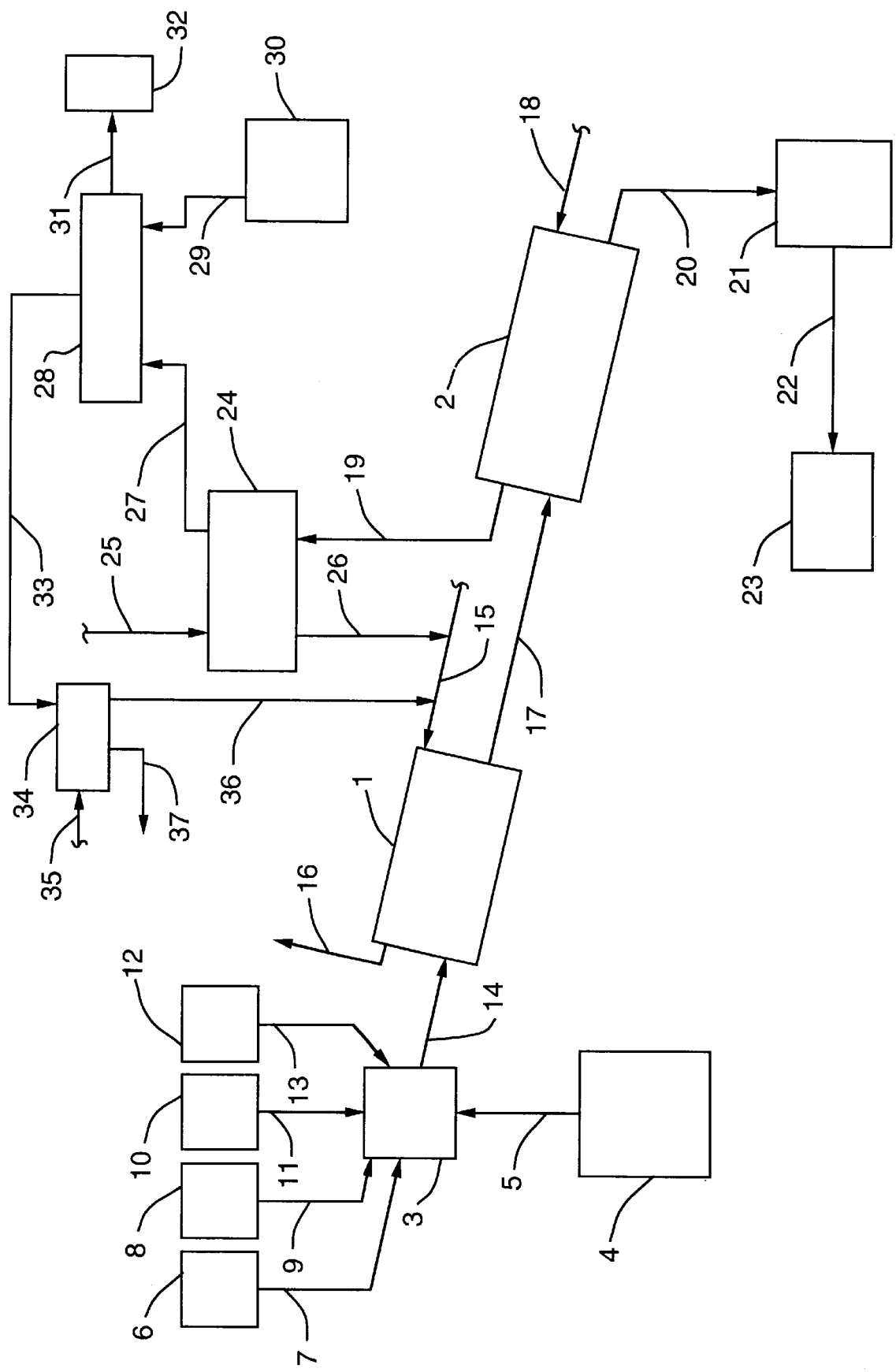

5,769,940

PROCESS FOR PRODUCING CEMENT AND ELEMENTAL SULFUR FROM A FLUE GAS DESULFURIZATION WASTE PRODUCT

CROSS REFERENCE TO RELATED APPLICATION

This application is a continuation-in-part of application Ser. No. 08/852,798 filed May 7, 1997 in the names of Manny Babu, John College and Russell Forsythe and entitled "Process For Producing Cement From a Flue Gas Desulfurization Process Waste Product".

FIELD OF THE INVENTION

The present application relates to a process for producing cement and elemental sulfur from a flue gas desulfurization process waste product containing calcium sulfite hemihydrate and calcium sulfate hemihydrate.

BACKGROUND OF THE INVENTION

Conventional cement manufacturing plants are usually adapted to form a cement clinker in a rotary kiln, with the cement clinker ground to a powdery substance as a cement product. The raw materials fed to the rotary kiln are a source of calcium, such as calcium oxide or carbonate, a siliceous compound, such as sand, and a source of aluminum and iron. Limestone, clay, shale or sand and iron ore may be used as raw materials. These raw materials are calcined in the rotary kiln, cooled and crushed to form cement.

In place of limestone or lime, as calcium sources fed to a cement process, processes have been developed where gypsum ($CaSO_4 \cdot 2H_2O$), or calcium sulfate ($CaSO_4$) have been used as a calcium source. In such processes, however, carbon such as coke, must also be added to the raw material charge to the calcination apparatus such that CaS is formed by the reaction of calcium sulfate and carbon:

$$CaSO_4 + 2C \rightarrow CaS + 2CO_2 \qquad (1)$$

with the CaS reacting with further $CaSO_4$ to form calcium oxide (CaO):

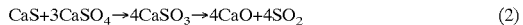

$$CaS + 3CaSO_4 \rightarrow 4CaSO_3 \rightarrow 4CaO + 4SO_2 \qquad (2)$$

In such calcium sulfate to cement processes, gypsum, upon decomposition acts as a calcium source for the cement production while the $SO_2$ produced is used to produce sulfuric acid. With gypsum ($CaSO_4 \cdot 2H_2O$), the same is dehydrated to $CaSO_4$ and the anhydrate blended with carbon and sand or shale, with the blended mixture fed to a kiln. The kiln is operated under slightly reducing conditions to ensure $CaSO_4$ decomposition. Since $CaSO_4$ is very difficult to decompose when heating, temperatures in excess of about 2600° F. (1425° C.) are normally required. With the presence of carbon, however, such decomposition temperatures are in the range of about 1800°–2100° F. (982°–1149° C.). In such a process, such as the known Muellar Kuenn process, the amount of carbon added must be carefully controlled since too much carbon will result in an excess of CaS and production of a poor cement clinker, while insufficient carbon results in contaminant $CaSO_4$ in the clinker and also results in a poor quality cement clinker. Any sulfur that remains will reduce the melting point of the cement clinker product and adversely effect the fusion of the calcium and silicon materials. Fusion is very important in cement clinker manufacture as it ultimately determines the strength characteristics of the cement. The fusion occurs at the burner side of the rotary kiln, opposite the raw material charge side of the kiln, with hot combustion gases passing countercurrent to the flow of the raw materials through the rotary kiln.

It has also been proposed to use gypsum that is a product of a flue gas desulfurization process using limestone as a sulfur dioxide absorption medium as, for example, described in U.S. Pat. No. 5,512,097. In that process, a reverse jet scrubber using finely divided limestone is provided and the calcium sulfate slurry formed by reaction of sulfur dioxide with calcium carbonate in the absorption medium is returned to a limestone comminution step of the cement making process.

When calcium sulfite is calcined to CaO, a gas stream is produced which contains a level of sulfur dioxide of between 5 and 20 percent. Such a gas stream can be difficult to process to produce sulfuric acid, since the sulfur dioxide concentration is low and must be diluted with oxygen for sufficient oxidation to occur. Such a condition can require relatively high capital costs to implement the process.

It is an object of the present invention to produce cement from a flue gas desulfurization process waste product and also to produce elemental sulfur from the off-gases of the calcination step of the cement-making process.

SUMMARY OF THE INVENTION

A process for producing cement from a flue gas desulfurization waste product is carried out by providing a moist flue gas desulfurization waste product containing 80–95 percent by weight solids of calcium sulfite hemihydrate and 5–20 percent by weight solids of calcium sulfate hemihydrate and adding thereto a source of aluminum and iron, such as fly ash, carbon, such as coke, and a siliceous material, such as sand, to form a moist mixture. The moist mixture is agglomerated, such as by pelletizing, while removing water therefrom to provide a dry agglomerated feedstock. The dry agglomerated feedstock is charged to a rotary kiln and calcined to produce a cement clinker which is cooled and pulverized to produce a cement. Sulfur dioxide that is released by calcination of the feedstock is discharged from the rotary kiln and cooled in an indirect heat exchanger while heating air fed to the feedstock agglomerator. The cooled sulfur dioxide is contacted with hydrogen and carbon monoxide in the presence of a reducing catalyst so as to form elemental sulfur which is separated and collected. The hydrogen and carbon monoxide source is preferably a reducing gas produced by gasification of coal.

BRIEF DESCRIPTION OF THE DRAWING

The invention will become more readily apparent from the following description of a preferred embodiment thereof shown, by way of example, in the accompanying drawing which is a schematic illustration of an embodiment of the process of the present invention.

DETAILED DESCRIPTION

The present process provides for the production of a salable cement product and elemental sulfur from a flue gas desulfurization process waste product which would normally be discarded as a landfill material.

The flue gas desulfurization process waste product used in the present manufacturing process is one which contains about 80–95 percent by weight solids of calcium sulfite hemihydrate and 5–20 percent by weight solids of calcium sulfate hemihydrate. Such a flue gas desulfurization process waste product can result from a wet scrubbing process for removing sulfur dioxide from a hot gaseous stream, such as a coal combustion flue gas, by contact of the gaseous stream with limestone, lime, or, preferably with a magnesium ion-containing aqueous lime slurry. In such magnesium-ion containing lime slurry wet scrubbing processes, as for example described in U.S. Pat. No. 3,919,393; U.S. Pat. No. 3,919,394; U.S. Pat. No. 4,164,549; the contents of which are incorporated by reference herein, an aqueous scrubbing slurry is formed from calcium hydroxide and magnesium hydroxide, where the magnesium hydroxide is present in an amount to provide an effective magnesium ion content in a wet scrubbing unit of between about 2500 and 9000 parts per million, and contacted with the sulfur dioxide-containing gas stream. Spent aqueous scrubbing medium is discharged from the wet scrubbing unit and passed to a thickener where a thickened waste sludge, as a flue gas desulfurization process waste product, is separated from the scrubbing liquor. The thickened sludge contains generally between about 20–30 weight percent solids and can be further dewatered, such as by centrifuging or filtering to provide a solids content in the flue gas desulfurization process of about 45–85 percent by weight solids. The solids content of the flue gas desulfurization process waste product, as above described, contains about 80–95 percent by weight calcium sulfite hemihydrate and 5–20 percent by weight calcium sulfate hemihydrate. With use of the hemihydrates of calcium sulfite and calcium sulfate, no precalcination step is required to drive off two water molecules as is required with gypsum ($CaSO_4 \cdot 2H_2O$).

In the present process, the flue gas desulfurization process waste product has added thereto a source of aluminum, a source of iron, a source of carbon, and a silica source such as a siliceous material to form a moist mixture. The source of aluminum may be clay or other aluminum-containing material, while the source of iron may be iron ore or other source of iron. An especially useful source of aluminum, iron and silica is fly ash which contains $Fe_2O_3$, $Al_2O_3$ and $SiO_2$. The source of carbon may be coke, while the siliceous material may be sand or shale. These particular additive materials are well known in the art of cement manufacture, as are other known materials which provide the aluminum, iron, carbon and silica in the desired proportions for manufacture of cement.

The moist mixture of the flue gas desulfurization process waste product, aluminum source, iron source, carbon source and silica source is then agglomerated to form an agglomerated feedstock for charging to a cement kiln. The water content of the moist mixture should be between about 5–20 percent by weight and, during agglomeration, the material should be dried so as to provide an agglomerated feedstock containing about 6 percent or less water, preferably by contact of the moist mixture with hot air during the agglomeration step. Conventional agglomerating apparatus such as extruders, rotary agglomerators, pug mills, or pelletizers may be used to form a dry (less than 6 percent or less water by weight) agglomerated kiln feedstock, while the drier may also be a rotary or other post agglomerating drier apparatus.

The dry agglomerated feedstock is then calcined to produce a cement clinker. Such calcination is effected in a conventional cement rotary kiln where the feedstock is charged at one end, the entry end, and passes countercurrent, in the rotary kiln, to a flow of hot combustion gases that are charged at other end, the exit end, of the kiln. During calcination, sulfur dioxide is released from the feedstock, adjacent the entry end of the rotary kiln, which sulfur dioxide is carried with the hot combustion gases and discharged from the rotary kiln. When the $CaSO_3 \cdot \frac{1}{2}H_2O$ and minor amount of $CaSO_4 \cdot \frac{1}{2}H_2O$ have been calcined to produce CaO in the rotary kiln, the CaO so produced by reaction with carbon then reacts with the silicon source, iron source and aluminum source in the dry agglomerated feedstock to form a cement clinker. Complete sulfur release is necessary because even a small amount of sulfur in the cement clinker will reduce the melting point of the product and adversely affect the fusion of the calcium and silicon components, which fusion determines the strength characteristics of the resultant cement product. Fusion is effected at a burner side or exit end of the rotary kiln and the cement clinker produced is discharged from the exit end, cooled, pulverized, and collected as a cement product.

In the present process, the sulfur dioxide-containing hot combustion gases discharged from the rotary kiln are used to heat air for drying additional moist mixture fed to the agglomerating apparatus and also to produce elemental sulfur. Because gases discharged from the agglomerating apparatus are laden with sulfur dioxide and cannot be humidified, the gases are passed to an indirect heat exchanger wherein the temperature of the hot discharged gases is lowered while a flow of air is heated to an elevated temperature. This heated air is then charged to the agglomerating drying apparatus and used to dry the moist mixture passing therethrough.

The sulfur dioxide-containing gases are discharged from the rotary kiln at a temperature of in excess of about 1100° C. and cooled in an indirect heat exchanger to a temperature of about 340°–580° C. The cooled gases are charged to a reactor where the sulfur dioxide is reduced to elemental sulfur, preferably by reduction using synthesis gas, a mixture of hydrogen and carbon monoxide, such as is produced in a conventional Wellman Galusha gasifier from coal, or from natural gas. A catalyst may be used for the reduction, such as a metal oxide supported on $g\text{-}Al_2O_3$, as described in "Reduction of Sulfur Dioxide by Syngas to Elemental Sulfur Oven Iron-Based Mixed Oxide Supported Catalyst", by Yun Jin, Quiquan Yu, and Shih-Ger Chung, Environmental Progress (Vol. 16, No. 1, pages 1–8) Spring 1997, the contents of which are incorporated by reference herein. In such a process, sulfur dioxide, preferably at a temperature of between about 340°–580° C. is contacted with hydrogen and carbon monoxide in the presence of a reducing catalyst.

In the reducing reactor, a chemical reduction of sulfur dioxide, by contact with hydrogen and carbon monoxide is effected and elemental sulfur is formed, which is then separated from the gas stream. Hot gases from the reducing reactor may then be used to preheat air that is fed to the agglomerating apparatus to dry additional moist mixture and produce further agglomerated feedstock for calcination in the rotary kiln.

The operating parameters of the rotary kiln, wherein the dry agglomerated feedstock is calcined to a cement clinker, such as off gas oxygen concentration, hot zone temperature, and/or material residence time is readily determined.

A cement clinker produced with a low freelime level (1.12%) and a low total sulfur level (0.04%) ($SO_3 \rightarrow 99.95\%$ volatilization) was produced using a single stage rotary kiln processing a mix containing a flue gas desulfurization process waste product containing 90% $CaSO_3 \cdot \frac{1}{2}H_2O$ and 10% $CaSO_4 \cdot \frac{1}{2}H_2O$. A test rotary kiln (1 foot inside diameter×15 feet length) operation with a residence time of 1.2 hr. (or less), 1500° C. hot zone temperature and $\leq 1.5\%$ off gas oxygen concentration should be sufficient to produce a cement clinker product with a low freelime level (<1.5%) and high sulfur volatilization (>99%). An especially useful moist mixture to produce a cement clinker with a $C_3S$ level of 59% was found to be 82.77% flue gas desulfurization process waste product (90% $CaSO_3.\frac{1}{2}H_2O$ and 10% $CaSO_4.\frac{1}{2}H_2O$); 5.80% fly ash; 6.43% silica sand and 5.00% coke (dry basis) using the above process parameters.

Referring now to the drawing, which schematically illustrates an embodiment of the present process, an agglomerating apparatus 1 is provided in association with a rotary kiln 2. To a mixing device 3, there are fed a moist flue gas desulfurization process waste product containing 80–95 percent by weight of solids of calcium sulfite hemihydrate and 5–20 percent by weight of solids of calcium sulfate hemihydrate from a source 4 through line 5, an aluminum source from a supply 6 through line 7, an iron source from a supply 8 through line 9, a carbon source from a supply 10 through line 11, and a silica source in the form of a siliceous material from a supply 12 through line 13. Fly ash, which is principally $SiO_2$, $Fe_2O_3$ and $Al_2O_3$ is preferred as the source of silica, iron and aluminum. A moist mixture, preferably containing about 5 to 20 weight percent water, of the flue gas desulfurization process waste product, aluminum, iron, carbon and silica is formed in the mixing device 3 which is fed through line 14 to the agglomerating apparatus 1. Also fed to the agglomerating apparatus 1 is a supply of hot air through line 15, which hot air is supplied at a temperature and flow rate sufficient to dry the moist mixture to form an agglomerated kiln feedstock containing about 6 percent or less water, with the moisture laden air produced discharged through line 16. The agglomerated feedstock, containing about 6 percent or less water, is discharged from the agglomerating apparatus and fed through line 17 to the rotary kiln 2. The rotary kiln 2 is heated, as is conventional by a burner (not shown) fed with fuel through line 18. Off gases from the rotary kiln 2 are discharged through line 19, while the calcined dry agglomerate feed, a cement clinker produced in the rotary kiln, is discharged through line 20 and fed to a pulverizer 21 wherein the cement clinker is ground to a suitable particle size and fed through line 22 to a cement collection device 23.

The dry agglomerated kiln feedstock, upon entry to the rotary kiln 2, is heated by the hot combustion gases from the kiln burner and sulfur dioxide is released from the feedstock material at the entry end of the rotary kiln. Sulfur dioxide is released during calcination of the calcium sulfite hemihydrate and calcium sulfate hemihydrate and substantially all of the sulfur content of the hemihydrates must be released in early stages of calcination or the solids may melt prematurely and fuse into a poor clinker material product. The sulfur dioxide released from the dry agglomerated kiln feedstock is carried, along with the combustion gases, through line 19 to an indirect heat exchanger 24 where the same is used to heat air from line 25, with the heated air passed through line 26 for use as hot air in line 15 fed to the agglomerating apparatus 1. The hot combustion gases containing sulfur dioxide, after passage through the indirect heat exchanger 24 are fed through line 27 to a reducing reactor 28. Hydrogen and carbon monoxide as also fed to the reducing reactor 28 through line 29, those gases shown are being provided from a source 30, which is preferably a Wellman Galusha gasification unit. Elemental sulfur formed in the reducing reactor 28 is removed through line 31 and collected at 32. Hot gases from the reducing reactor 28 may be fed through line 33 and through an indirect heat exchanger 34 to heat air from line 35, which heated air is fed through line 36 to line 15 for use in drying the moist mixture in agglomerating apparatus 1. Off gases from the reducing reactor 28 are discharged from the reducing reactor 28 through line 37.

What is claimed is:

1. A process for producing cement and elemental sulfur from a flue gas desulfurization process waste product, comprising:

providing a moist flue gas desulfurization process waste product containing 80–95 percent by weight of solids of calcium sulfite hemihydrate and 5–20 percent by weight of solids of calcium sulfate hemihydrate;

adding a source of aluminum, iron, carbon, and a siliceous material to said flue gas desulfurization process waste product to form a moist mixture thereof;

agglomerating said moist mixture while removing water therefrom, by contact with hot air, to provide a dry agglomerated kiln feedstock containing about 6 percent or less water;

calcining said dry agglomerated kiln feedstock in a rotary kiln to produce a cement clinker and a sulfur dioxide-containing gas;

discharging said sulfur dioxide-containing gas from said rotary kiln into an indirect heat exchanger to cool said gas;

contacting the resultant cooled sulfur dioxide-containing gas with hydrogen and carbon monoxide in the presence of a reducing catalyst sufficient to form elemental sulfur;

separating said elemental sulfur therefrom.

2. The process for producing cement from a flue gas desulfurization process waste product as defined in claim 1 wherein said source of aluminum and iron comprises fly ash.

3. The process for producing cement from a flue gas desulfurization process waste product as defined in claim 1 wherein said waste product results from a flue gas desulfurization process using a magnesium-enhanced lime slurry for reaction with sulfur dioxide in a gas stream.

4. The process for producing cement from a flue gas desulfurization process waste product as defined in claim 1 wherein said waste product results from a flue gas desulfurization process using lime for reaction with sulfur dioxide in a gas stream.

5. The process for producing cement from a flue gas desulfurization process waste product as defined in claim 1 wherein said waste product results from a flue gas desulfurization process using limestone for reaction with sulfur dioxide in a gas stream.

6. The process for producing cement from a flue gas desulfurization process waste product as defined in claim 1 wherein said moist mixture contains between about 5 to 20 weight percent of water.

7. The process for producing cement from a flue gas desulfurization process waste product as defined in claim 1 wherein said dry agglomerated kiln feedstock has a solid content comprising, by weight, 82.77 percent flue gas desulfurization process waste product, 5.80 percent fly ash, 6.43 percent sand, and 5.0 percent coke.

8. The process for producing cement from a flue gas desulfurization process waste product as defined in claim 1 wherein hot gases, after formation to form elemental sulfur, are used to preheat air and said preheated air is used to remove water from said moist mixture during agglomeration.

9. The process for producing cement from a flue gas desulfurization process waste product as defined in claim 1 wherein said sulfur dioxide-containing gas is discharged from said rotary kiln at a temperature in excess of about 1100° C. and cooled in said indirect heat exchanger to a temperature of between about 340°–580° C.

10. The process for producing cement from a flue gas desulfurization process waste product as defined in claim 1 wherein said hydrogen and carbon monoxide are components of a synthesis gas produced by gasification of coal.

11. A process for producing cement and elemental sulfur from a flue gas desulfurization process waste product, comprising:

providing a moist flue gas desulfurization process waste product containing 80–95 percent by weight of solids of calcium sulfite hemihydrate and 5–20 percent by weight of solids of calcium sulfate hemihydrate;

adding fly ash containing aluminum and iron, carbon, and sand to said flue gas desulfurization process waste product to form a moist mixture thereof;

agglomerating said moist mixture while removing water therefrom, by contact with hot air, to provide a dry agglomerated kiln feedstock containing about 6 percent or less water;

calcining said dry agglomerated kiln feedstock in a rotary kiln to produce a cement clinker and a sulfur dioxide-containing gas;

discharging said sulfur dioxide-containing gas from said rotary kiln into an indirect heat exchanger to cool said gas and heat air;

passing said heated air to said agglomerating step to remove water from further said moist mixture during agglomeration;

contacting the resultant cooled sulfur dioxide-containing gas with hydrogen and carbon monoxide in the presence of a reducing catalyst sufficient to form elemental sulfur;

separating said elemental sulfur therefrom.

* * * * *

UNITED STATES PATENT AND TRADEMARK OFFICE
CERTIFICATE OF CORRECTION

PATENT NO. : 5,769,940
DATED : June 23, 1998
INVENTOR(S) : John W. College

It is certified that error appears in the above-identified patent and that said Letters Patent is hereby corrected as shown below:

ABSTRACT

Line 3 - "sulfate" should read --sulfite--.

Signed and Sealed this

First Day of September, 1998

*Attest:*

BRUCE LEHMAN

*Attesting Officer*          *Commissioner of Patents and Trademarks*